United States Patent [19]

Brada

[11] Patent Number: 5,486,986
[45] Date of Patent: Jan. 23, 1996

[54] REMOTE CONTROL ILLUMINATED MAGNIFIER

[76] Inventor: Carla R. Brada, 28072 Via Del Cerro, San Juan Capistrano, Calif. 92675

[21] Appl. No.: 221,086

[22] Filed: Mar. 29, 1994

[51] Int. Cl.[6] .................................................. F21V 33/00
[52] U.S. Cl. ..................... 362/85; 362/23; 362/109
[58] Field of Search ................................. 362/23, 85, 109

[56] References Cited

U.S. PATENT DOCUMENTS

| Re. 33,970 | 6/1992 | Butler | 248/176 |
|---|---|---|---|
| 1,909,662 | 5/1933 | Conners | 362/109 |
| 4,733,776 | 3/1988 | Ward | 206/305 |
| 4,836,256 | 6/1989 | Meliconi | 206/523 |
| 4,905,127 | 2/1990 | Kaminski | 362/109 |
| 5,119,239 | 6/1992 | Iaquinto et al. | 359/811 |
| 5,122,937 | 6/1992 | Stoudemire | 362/109 |
| 5,172,974 | 12/1992 | Riban | 362/23 |
| 5,325,278 | 6/1994 | Tortola et al. | 362/109 |

OTHER PUBLICATIONS

Advertisement for Monarch Bay Drugs–Nov. 1993.

*Primary Examiner*—Carroll B. Dority
*Attorney, Agent, or Firm*—Stetina Brunda & Buyan

[57] ABSTRACT

A remote control has a housing having at least one control disposed thereon and a magnifier disposed proximate said housing, preferably at the forward end thereof. The magnifier enhances a user's ability to read printed matter such as program listings and the like. The magnifier may either be integrally formed with the housing or removably attachable thereto. A first illuminator is disposed proximate the housing and is configured so as to enhance viewing of the controls thereof. The first illuminator may either be integrally formed with the housing or removably attachable thereto. A second illuminator is disposed proximate the housing and is configured so as to enhance viewing of printed matter. The second illuminator may likewise be integrally formed with the housing or removably attachable thereto.

8 Claims, 2 Drawing Sheets

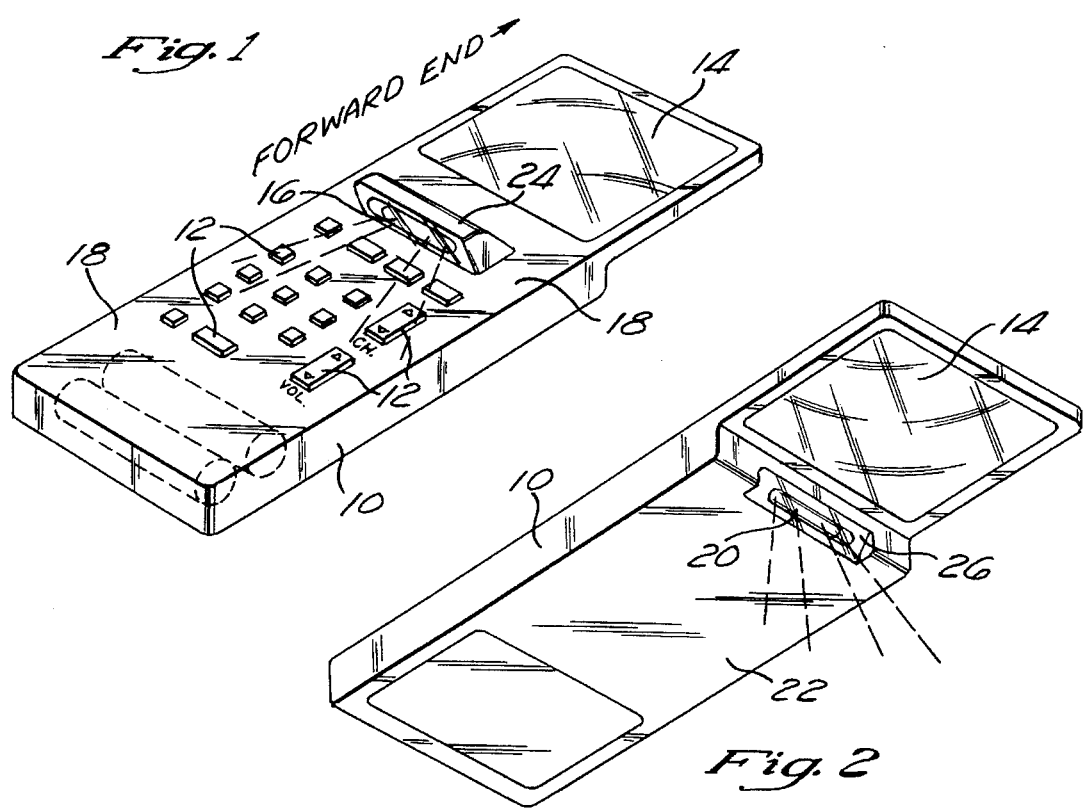
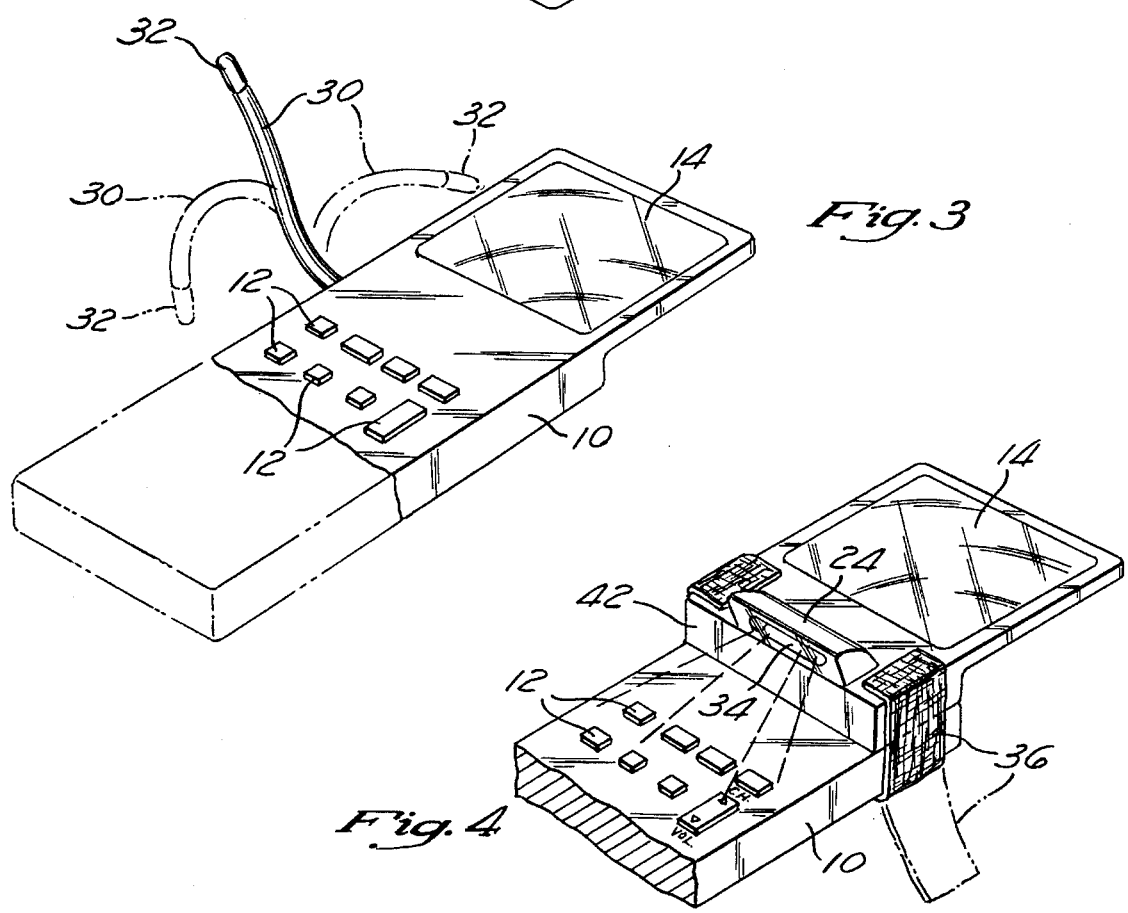

REMOTE CONTROL ILLUMINATED MAGNIFIER

FIELD OF THE INVENTION

The present invention relates generally to television remote controls and more particularly to a remote control having a magnifier for enhancing a user's ability to read printed matter such as television listings and optionally also having a first illuminator for illuminating the controls thereof and a second illuminator for illuminating the printed matter.

BACKGROUND OF THE INVENTION

Remote controls for remotely operating televisions, VCR's, stereos, and the like are well known. Such remote controls typically comprise a hand-held housing upon which a plurality of controls, i.e., typically buttons, are disposed.

Such remote controls are commonly utilized with program listings and the like to which a user refers in order to determine which channel to view, listen to, or record. The entries of such program listings and the like are frequently printed in comparatively small type, making reading thereof difficult, particularly for the elderly and those with impaired eyesight.

As such, it would be beneficial to provide a means for enhancing a user's ability to read the printed matter of such program listings and the like so as to facilitate easier use thereof.

Additionally, it is a common practice for a user to watch television, use a VCR, and/or listen to a stereo in a situation wherein the lighting conditions are insufficient for comfortable reading of program listings and the like. For example, people frequently watch television while resting upon a bed with the lights turned low or off.

In such situations of inadequate lighting, it is also difficult to identify the individual controls of the remote control, thus making operation thereof difficult. For instance, when it is desired to change a television channel utilizing the remote control, one must frequently press several of the buttons of a remote control before the correct button is found. Pressing the wrong buttons occasionally has an undesirable effect such as increasing or decreasing the volume.

In such circumstances, it is generally undesirable to turn on the lights or otherwise increase illumination. It is often inconvenient to turn on the lights, particularly in those circumstances wherein it is necessary to leave the bed and walk across the room to a light switch. Furthermore, one may desire to maintain such a low level of lighting so as not to disturb another person who is resting or sleeping nearby.

As such, it is desirable to provide illumination means for a remote control wherein the illumination means allows the user to easily read printed matter such as program listings and also allows the user to readily identify the individual controls of the remote control. It is also desirable to provide a means for magnifying or enhancing a user's ability to read printed matter such as television listings, regardless of the level of illumination.

SUMMARY OF THE INVENTION

The present invention specifically addresses and alleviates the above mentioned deficiencies associated with the prior art. More particularly, the present invention comprises a remote control comprising a housing having at least one control disposed thereon and a magnifier disposed proximate said housing, preferably at the forward end thereof. The magnifier enhances a user's ability to read printed matter such as program listings and the like. The magnifier may either be integrally formed with the housing or removably attachable thereto. A hook and loop fastening strap may be used for facilitating removable attachment of the magnifier to the housing.

Optionally, a first illuminator is disposed proximate the housing and is configured so as to enhance viewing of the controls thereof. The first illuminator may either be integrally formed with the housing or removably attachable thereto.

optionally, a second illuminator is disposed proximate the housing and is configured so as to enhance viewing of printed matter. The second illuminator may likewise be integrally formed with the housing or removably attachable thereto.

The magnifier, first illuminator, and second illuminator, are optionally all formed upon a common body so as to facilitate easy attachment to and removal from the remote control.

The magnifier preferably comprises a fresnel lens, preferably formed of a transparent polymer material. Those skilled in the art will recognize that various other magnifying lenses, i.e., convex lenses, may be formed of various other transparent materials, e.g., glass, etc.

The first and second illuminators are preferably disposed substantially flush with the housing so as to provide a streamlined configuration.

Alternatively, a single illuminator is disposed at the distal end of a flexible arm so as to both enhance viewing of the controls and enhance viewing of printed matter. The flexible arm may be bent so as to position the illuminator above the controls or below the magnifier, i.e., proximate printed matter to be read, as desired.

The illuminator preferably comprises an LED so as to maximize efficiency thereof and thereby reduce the frequency of undesirable battery changes. Those skilled in the art will recognize that various other illumination means, e.g., incandescent lamps, are likewise suitable.

Separate control means optionally effect actuation of the first and/or second illuminators. Alternatively, such first and/or second illuminators actuate upon pressing any button of the remote control. Such operation facilitates easy actuation of the illuminators without requiring that the user correctly identify and specifically actuate a dedicated control therefore. The remote control may be pointed in any direction other than that required for proper operation thereof when non-dedicated buttons are utilized to control actuation of the illuminators.

The magnifier is preferably disposed at the forward end of the remote control so as to facilitate convenient viewing of printed matter therewith while holding the remote control in a fashion which readily facilitates actuation of the controls thereof. Thus, utilizing the remote control illuminator magnifier of the present invention, a user may readily view a program listing while sitting in an environment having inadequate lighting and may also accurately and reliably find and actuate desired controls thereof. The magnifier enlarges the type of the program listing, thereby substantially improving readability thereof while the second illuminator provides illumination so as to facilitate reading of the program listing.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of the top of a first embodiment of the remote control illuminated magnifier of the present invention;

FIG. 2 is a perspective view of the bottom of a first embodiment of the remote control illuminated magnifier of the present invention;

FIG. 3 is a perspective view of the top of a second embodiment of the remote control illuminated magnifier of the present invention;

FIG. 4 is a fragmentary perspective view of the top of a third embodiment of the remote control illuminated magnifier of the present invention;

DETAILED DESCRIPTION OF THE PREFERRED EMBODIMENT

Figure 5:
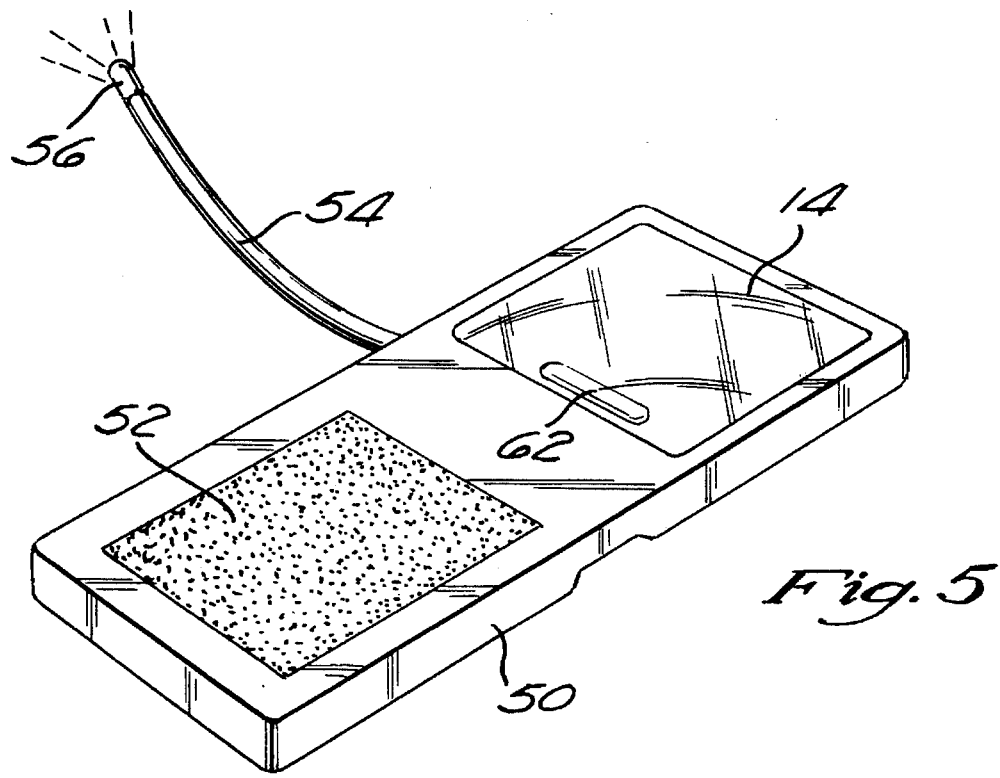
FIG. 5 is a perspective view of a fourth embodiment of the remote control illuminated magnifier of the present invention, showing the upper surface thereof.

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The remote control illuminated magnifier of the present invention is illustrated in FIGS. 1 through 6 which depict four presently preferred embodiments of the invention. The first embodiment, depicted in FIGS. 1 and 2, has an integrally formed magnifier, as well as integrally formed first and second illuminators. The second embodiment, illustrated in FIG. 3, has an integrally formed magnifier and a single illuminator disposed upon the distal end of a flexible arm. The third embodiment, illustrated in FIG. 4, comprises an after market or add-on magnifier and optional first and/or second illuminators, wherein the magnifier and illuminator(s) are attached to the remote control via a velcro strap. The fourth embodiment, illustrated in FIGS. 5 and 6, comprises an after market or add-on magnifier and optional single illuminator disposed upon the distal end of a flexible arm, wherein the magnifier and illuminator are attached to a remote control via double sided tape.

Referring now to FIGS. 1 and 2, the first embodiment of the remote control illuminated magnifier of the present invention is comprised generally of a housing 10 having a plurality of controls 12, typically pushbuttons, formed thereupon, and having a magnifier 14 integrally formed with the housing 10.

The magnifier 14 preferably comprises a lightweight polymer fresnel magnifying lense. Alternatively, the magnifier 14 may comprise a convex lense, which may be formed of various different transparent materials.

A first illuminator 16 is disposed substantially flush to the upper surface 18 of the housing 10 and is configured so as to illuminate the controls 12. A hood 24 preferably covers the first illumination means 16.

A second illuminator 20 is disposed substantially flush to the lower surface 22 of the housing 10 and is configured to illuminate printed matter disposed beneath the housing 10, preferably within the view of the magnifier 14. The second illuminator 20 is preferably disposed within a cut-out 26 formed at the forward end of the lower surface 22 of the housing 10.

The first 16 and second 20 illuminators preferably comprise LED's. Thus, power consumption is minimized and battery life maximized. Those skilled in the art will recognize that various other illumination means are likewise suitable.

Having thus described the structure of the first embodiment of the remote control illuminated magnifier of the present invention, it may be beneficial to describe the operation thereof. When adequate lighting exists, the first 16 and second 20 illuminators need not be utilized. Printed matter, i.e., a program listing, is placed in the view of the magnifier 14 such that the text or other indicia thereof is enlarged so as to facilitate easy viewing thereof. The user may hold the housing 10 of the remote control in a manner which facilitates convenient manipulation of the controls 12 thereof while simultaneously viewing the printed matter.

In those instances where inadequate lighting exists for viewing the printed matter, the second illumination means 20 is activated. Activation of the second illuminator 20 may occur as a result of actuation of a dedicated control such as one of the push buttons of controls 12, or alternatively may occur when any of the push buttons 12 are depressed. In the event that activation of any of the push buttons of control 12 results in activation of the second illuminator 20, the remote control may be aimed away from the television so as not to result in actuation thereof.

Actuation of the second illuminator 20 thus results in illumination of printed matter disposed within the view of magnifier 14, thereby facilitating reading of the printed matter in low light or dark conditions.

The first illuminator 16 may similarly be actuated, either via a dedicated control or by pressing any button of the controls 12 so as to illuminate the controls 12 and thereby facilitate reliable and accurate use thereof. Separate dedicated controls for the first 16 and second 20 illuminators are optionally provided.

Referring now to FIG. 3, a second embodiment of the remote control illuminated magnifier of the present invention is illustrated. Like the first embodiment of the present invention, the second embodiment thereof comprises a housing 10 having a magnifier 14 integrally formed therewith. A flexible arm 30 extends from the housing 10, preferably from one side thereof, and is of sufficient length, typically 2–6 inches, preferably approximately 4 inches in length to provide illumination to either the controls 12 or the printed matter, as desired. A light 32, preferably an LED, is disposed at the distal end of the flexible arm 30. Thus, the flexible arm 30 may be bent so as to illuminate either the controls 12 formed upon the housing 10 or printed matter disposed within the view of the magnifier 14, as desired.

Actuation of the LED 32 and use of the second embodiment of the remote control illuminated magnifier of the present invention is analogous to the first embodiment thereof.

Referring now to FIG. 4, a third embodiment of the remote control illuminated magnifier of the present invention is illustrated. In the third embodiment of the present invention, a removably attachable body 42 has a magnifier 14 formed thereon, analogous to that of the first and second embodiments of the present invention. A first illuminator 34 is disposed substantially flush with the body 32 and preferably has a hood 24. A second illuminator (not shown) may optionally be formed upon the body 32 in a manner analogous to that of the first and second embodiments of the present invention. A VELCRO type hook and loop fastening strap 36 is preferably utilized to removably attach the body 32 to the housing 10 of the remote control. Those skilled in the art will recognize that various other means are likewise suitable for removably attaching the body 32 to the housing 10.

In the removably attachable third embodiment of the remote control illuminated magnifier of the present invention, dedicated controls are preferably used to effect illumination of the first 34 and/or second illuminators. Those skilled in the art will recognize that various means for effecting actuation of the first 34 and second illuminators are likewise suitable.

Figure 6:
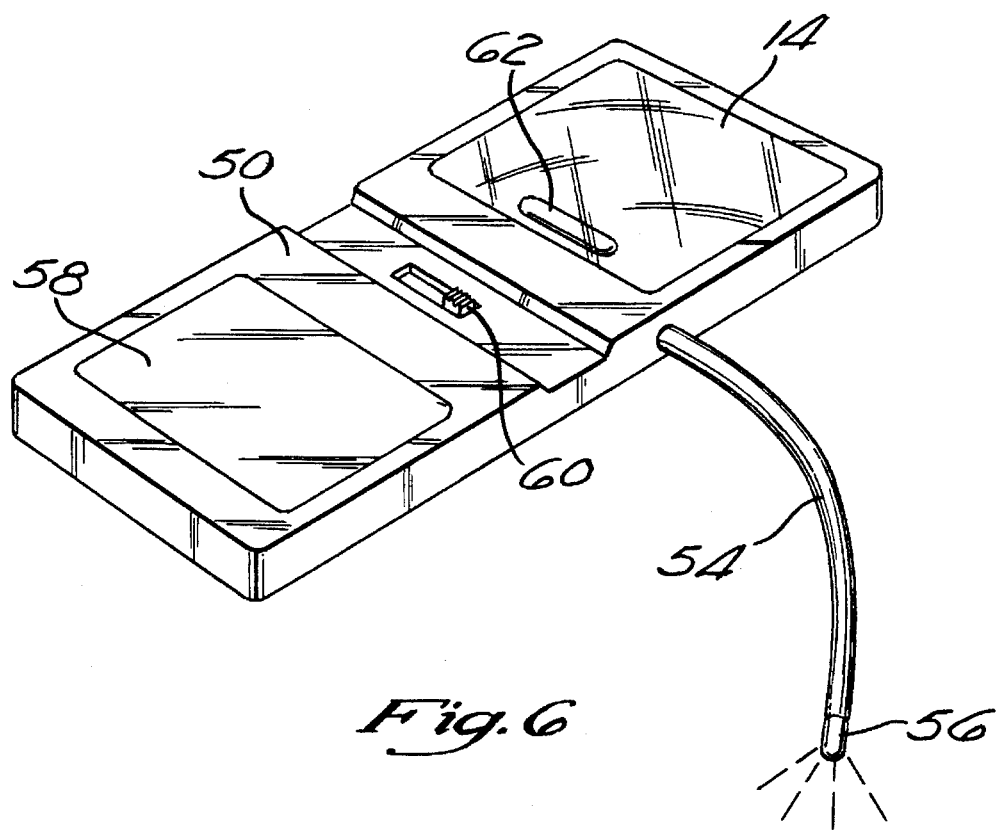
FIG. 6 is a perspective view of the fourth embodiment of FIG. 5, showing the lower surface thereof.

Referring now to FIGS. 5 and 6, a fourth embodiment of the remote control illuminated magnifier of the present invention is illustrated. In the fourth embodiment of the present invention, a removably attachable body 50 has a magnifier 14 formed thereon, analogous to that of the first, second and third embodiments of the present invention. An illuminator 56 is disposed upon a flexible arm 54, as in the second embodiment of the present invention. The arm 54 is attached to the body 50. Optionally, an illuminator 62 is attached proximate the magnifier 14.

With particular reference to FIG. 5, the body 50 is approximately 5.5 inches long by 2.5 inches wide and is removably attachable to the remote control via double sided tape 52 formed upon the upper surface of the body 50.

With particular reference to FIG. 6, a battery compartment 58 is accessible from the underside of the body 50 and an on/off switch 60 facilitates control of the illuminator 56.

Thus, the fourth embodiment of the present invention may be attached to a remote control by peeling a protective layer (not shown) from-the double sided tape 52 thereof, so as to expose the adhesive surface of the double sided tape 52. The upper surface of the body 50 is then brought into contact with the lower surface of the remote control so as to cause the double sided tape 52 to adhere to the lower surface of the remote control, thereby attaching the fourth embodiment of the present invention thereto.

It is understood that the exemplary remote control illuminated magnifiers described herein and shown in the drawings represent only presently preferred embodiments of the invention. Indeed, various modifications and additions may be made to such embodiments without departing from the spirit and scope of the invention. For example, various configurations of the first and second illuminators are contemplated. The first and second illuminators need not be flush mounted with the housing of the remote control, but rather may alternatively extend substantially therefrom. Additionally, the magnifier need not extend from the forward end of the housing 10, but rather may extend from any desirable portion thereof. Indeed, the magnifier need not be rigidly attached or formed to the housing 10, but alternatively rather may be hingeably or flexibly disposed relative thereto such that the magnifier 14 folds open with respect to the body 10. For example, a hinge member may optionally be disposed intermediate the magnifier 14 and the housing 10 to facilitate such folding. Thus, these and other modifications and additions may be obvious to those skilled in the art and may be implemented to adapt the present invention for use in a variety of different applications.

What is claimed is:

1. An attachment for a television remote control having a plurality of controls, said attachment comprising:
   a) a housing having first and second opposed sides thereof attachable to a television remote control;
   b) a first light source formed upon a flexible arm attached to said housing; and
   c) a second light source formed upon the second side of said housing;
   d) wherein said first and second light sources are configured to facilitate substantially simultaneous viewing of said controls and reading of printed matter remote from the television remote control.

2. The attachment for a television remote control as recited in claim 1 further comprising a magnifier disposed proximate said second light source such that said magnifier further permits a farsighted user to alternately view the printed material and observe scenes on the television without the need to apply and remove corrective lenses.

3. An attachment for a television remote control having a plurality of controls, said attachment comprising:
   a) a housing having first and second opposed sides thereof attachable to a television remote control;
   b) a first light source formed upon a flexible arm attached to said housing to facilitate viewing of said controls; and
   c) a second light source formed upon the second side of said housing to facilitate viewing of printed material remote from the television remote control.

4. The attachment for a television remote control as recited in claim 3 wherein said housing is removably attachable to said television remote control.

5. The attachment for a television remote control as recited in claim 4 wherein said housing is attachable to said television remote control via at least one of double-sided tape and velcro.

6. The attachment for a television remote control as recited in claim 3 further comprising a magnifier disposed proximate said second light source such that said magnifier further permits a far-sighted user to alternatively view the printed material and observe scenes on the television without the need to apply and remove corrective lenses.

7. The attachment for a television remote control as recited in claim 6 wherein said magnifier comprises a convex lens.

8. The attachment for a television remote control as recited in claim 6 wherein said magnifier comprises a fresnel lens.

* * * * *